(12) United States Patent
Xu et al.

(10) Patent No.: US 6,380,333 B1
(45) Date of Patent: Apr. 30, 2002

(54) GROUP 8, 9 OR 10 OLEFIN COPOLYMERIZATION CATALYST

(75) Inventors: Wei Xu; Qinyan Wang, both of Calgary (CA)

(73) Assignee: NOVA Chemicals (International) S.A., Villars-sur-Glane (CH)

( * ) Notice: Subject to any disclaimer, the term of this patent is extended or adjusted under 35 U.S.C. 154(b) by 69 days.

(21) Appl. No.: 09/636,529

(22) Filed: Aug. 10, 2000

Related U.S. Application Data

(62) Division of application No. 09/193,453, filed on Nov. 17, 1998, now Pat. No. 6,133,387.

(51) Int. Cl.⁷ .............................. C08F 4/26; C08F 4/44; C07D 49/20
(52) U.S. Cl. .................... 526/134; 526/172; 526/348.6; 526/352; 556/13; 556/138; 546/21
(58) Field of Search ............................ 546/21; 526/134, 526/172, 348.6, 352; 502/162; 556/13, 138

(56) References Cited

U.S. PATENT DOCUMENTS

| | | | | |
|---|---|---|---|---|
| 5,557,023 A | * | 9/1996 | Somogyvari et al. | ........ 585/513 |
| 5,589,555 A | * | 12/1996 | Zberil et al. | .................. 526/64 |

\* cited by examiner

*Primary Examiner*—Alan L. Rotman
*Assistant Examiner*—Raymond Covington
(74) *Attorney, Agent, or Firm*—Kenneth H. Johnson

(57) ABSTRACT

Olefin co- or homopolymers having a good molecular weight and short chain branching may be prepared in the presence of a pyridyl bridged bisphosphinimine complex of a Group 8, 9 or 10 metal.

16 Claims, No Drawings

US 6,380,333 B1

GROUP 8, 9 OR 10 OLEFIN COPOLYMERIZATION CATALYST

This application is a division of Ser. No. 09/193,453 filed Nov. 17, 1998, now U.S. Pat. No. 6,133,387.

FIELD OF THE INVENTION

The present invention relates to late transition metal complexes, a process for their preparation and their use in the polymerization of olefins.

BACKGROUND OF THE INVENTION

The papers in Organometallics, 10, 1421–1431, 1991; Inorg. Chem., 34, 4092–4105, 1995; J. Organomet. Chem., 527(1–2), 263–276,1997; and Inorg. Chem., 35(6), 1518–28, 1996, report the reaction of bis (iminophosphoranyl) methane (BIPM) which are typically aryl substituted on the phosphorus atom and the nitrogen with Group 8, 9 or 10 metal halides (chlorides) further comprising at two weakly coordinating ligands (L) such as nitrites or cyclooctadiene, afforded several products depending on the reaction time, type of ligand or nature of the metal. The product could be a N-C chelating type product or a N-N chelating product (similar to those of the present invention).

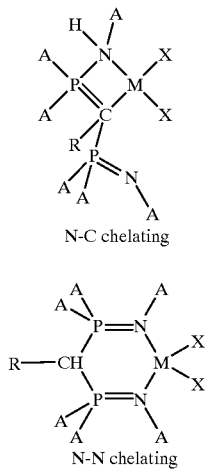

The products contain alkyl bridges between the phosphinimine groups and the references do not disclose the pyridyl bridged compounds of the present invention. Further, none of the references teach or suggest the use of such compounds for the polymerization of alpha olefins.

U.S. Pat. No. 5,557,023 issued September, 1996 teaches the use of some phosphinimines complexes to oligomerize alpha olefins. However, the complexes disclosed are not bisphosphinimine complexes. Rather, the complexes are of the structure indicated below.

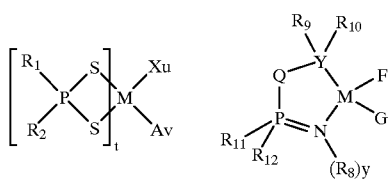

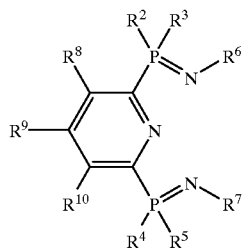

wherein R, Q, etc. are as defined in the patent. The structures disclosed in the patent are not the bisphosphinimines of the present invention. While the reference does teach oligomerization, it does not suggest polymerization.

WO 98/30609 patent application published Jul. 16, 1998 assigned to E. I. du Pont de Nemours teaches the use of various complexes of nickel to polymerize alpha olefins. The most structurally similar complex in the disclosure is compound XXXXI at the middle of page 9 and the associated description of the various substituents. However, the compound does not contain a pyridyl bridge. Rather, the nickel atom completes the cyclic structure in the middle of the compound. The reference does not contemplate or disclose compounds of the present invention which have a pyridyl bridge between the bisphosphinimine functionality. The reference fails to disclose the subject matter of the present invention.

There are a number of patents and papers by Brookhart and/or Gibson disclosing the use of Group 8, 9 or 10 metals to polymerize olefins. However, such papers did not teach the copolymerizations (e.g. WO 98/27124). The present invention provides olefin copolymerization using an iron based catalyst.

SUMMARY OF THE INVENTION

The present invention provides a process for the polymerization of one or more $C_{2-12}$ alpha olefins in the presence of an activatable complex of a Group 8, 9 or 10 metal and ligand of formula I:

wherein $R^2$, $R^3$, $R^4$ and $R^5$ are independently selected from the group consisting of a hydrocarbyl radical which is unsubstituted, further substituted or an inert functional group; $R^6$ and $R^7$ are independently selected from the group consisting of a hydrocarbyl radical which is unsubstituted or further substituted, trialkyl silyl radical and an inert functional group; and $R^8$, $R^9$ and $R^{10}$ are independently selected from the group consisting of a hydrogen atom, a hydrocarbyl radical which is unsubstituted or further substituted and an inert functional group.

A further aspect of the present invention provides a process for the polymerization of one or more $C_{2-12}$ alpha olefins in the presence of:

(a) a complex comprising a Group 8, 9 or 10 metal and ligand of formula I:

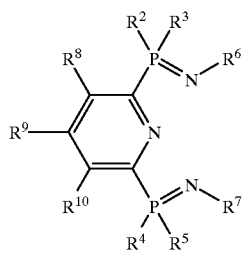

wherein $R^2$, $R^3$, $R^4$ and $R^5$ are each independently selected from the group consisting of hydrocarbyl, substituted hydrocarbyl or an inert functional group; $R^6$ and $R^7$ are each independently selected from hydrocarbyl, substituted hydrocarbyl, trialkyl silyl and substituted or unsubstituted aryl; and $R^8$, $R^9$ and $R^{10}$ are each independently selected from hydrogen, hydrocarbyl, substituted hydrocarbyl, an inert functional group; and (b) an activator at a temperature from 20 to 250° C. and at a pressure from 15 to 15000 psi.

In a further aspect, the present invention provides a process for reacting one or more $C_{2-12}$ alpha olefins in the presence of a catalyst of formula III:

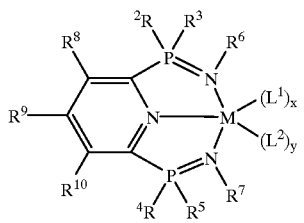

wherein $R^2$ to $R^{10}$ and M are defined above; $L^1$ is a neutral monodenate ligand which is displaced by one or more of an activator, a scavenger or a monomer; x is from 0 to 12; $L^2$ is an activatable ligand; and y is the oxidation state of the metal; with an activator at a temperature from 20 to 250° C. and at a pressure from 15 to 15000 psi.

The present invention further comprises reacting a compound of formula II:

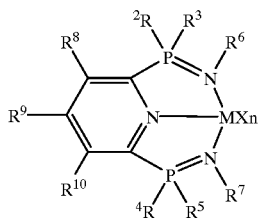

wherein $R^2$, $R^3$, $R^4$, $R^5$, $R^6$, $R^7$, $R^8$, $R^9$, $R^{10}$ and M are as defined above, X is a halogen and n is an integer from 1 to 3 with an alkylating agent at a temperature from −50 to 250° C. to produce a compound of formula III as defined above.

The present invention also provides an olefin co- or homopolymer having a weight average molecular weight (Mw) from $5\times10^4$ to $10^7$ and a degree of short chain branching from 1–30 per 1000 carbon atoms prepared in the presence of an iron (or cobalt) containing catalyst.

DETAILED DESCRIPTION

The term "scavenger" as used in this specification is meant to include those compounds effective for removing polar impurities from the reaction solvent. Such impurities can be inadvertently introduced with any of the polymerization reaction components, particularly with solvent, monomer and catalyst feed; and can adversely affect catalyst activity and stability. It can result in decreasing or even elimination of catalytic activity, particularly when an activator capable of ionizing the Group 8, 9 or 10 metal complex is also present.

The term "an inert functional group" means a functional group on a ligand or substituent which does not participate or react in the polymerization reaction. For example, in the polymerization aspect of the present invention an inert functional group would not react with any of the monomers, the activator or the scavenger of the present invention. Similarly for the alkylation of the metal complex or the formation of the metal complex the inert functional group would not interfere with the alkylation reaction or the formation of the metal complex respectively.

The phrase "a neutral monodenate ligand" means a ligand which is only loosely bound to the metal by a coordinative bond. These may include water ($H_2O$) or tetrahydrofuran (THF).

As used in this specification, an activatable ligand is a ligand removed or transformed by an activator. These include anionic substituents and/or bound ligands. Exemplary activatable ligands are independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryl oxy radical, an amido radical which is unsubstituted or substituted by up to two $C_{1-8}$ alkyl radicals, and a phosphido radical which is unsubstituted or substituted by up to two $C_{1-8}$ alkyl radicals.

In the above compounds formula I-III, $R^2$, $R^3$, $R^4$ and $R^5$ are independently selected from the group consisting of a hydrocarbyl radical and an inert functional group. Preferably $R^2$, $R^3$, $R^4$ and $R^5$ are selected from the group consisting of $C_{1-10}$ alkyl or aryl radicals, most preferably $C_{1-4}$ radicals such as a bulky t-butyl radical and phenyl radicals. In the above compounds, $R^8$, $R^9$ and $R^{10}$ are independently selected from the group consisting of a hydrogen atom, a hydrocarbyl radical which is unsubstituted or further substituted and an inert functional group, preferably a hydrogen atom and a $C_{1-10}$, most preferably a $C_{1-4}$ alkyl radical. In the above formula, $R^6$ and $R^7$ are independently selected from the group consisting of a hydrocarbyl radical, preferably a phenyl radical which is unsubstituted or substituted by up to five hydrocarbyl radicals, or a $C_{1-10}$ alkyl radical, or two hydrocarbyl radicals taken together may form a ring, or a trialkyl, preferably $C_{1-6}$, most preferably $C_{1-4}$ silyl radical. In the complex of formula III, $R^2$ through $R^{10}$ are as defined above and $L^1$ is a neutral monodenate ligand easily displaced by one or more of a scavenger, activator or monomer, preferably water or tetrahydrofuran. $L^2$ is an activatable ligand, preferably a halogen or a $C_{1-6}$ alkyl or alkoxide radical, most preferably a chloride, bromide, or a $C_{1-4}$ alkyl or alkoxide radical; x is from 0 to 12, preferably from 0 to 6; and y is the oxidation state of the metal M, preferably 2 or 3.

In the compound of formula I and III, preferably $R^8$, $R^9$ and $R^{10}$ are independently selected from the group consisting of a hydrogen atom or a hydrocarbyl radical, preferably a hydrogen atom and a $C_{1-4}$ alkyl radical; $R^4$, $R^5$, $R^2$ and $R^3$ are independently selected from the group consisting of a hydrocarbyl radical which is unsubstituted or further substituted and an inert functional group; and $R^6$ and $R^7$ are independently selected from the group consisting of trimethyl silyl and an aryl radical, preferably from 6 to 14 carbon atoms which is unsubstituted or substituted by one or more radicals selected from the group consisting of $C_{1-6}$ hydrocarbyl radicals, most preferably 2,6-di-isopropyl phenyl radicals. In a particularly preferred aspect of the present invention $R^8$, $R^9$ and $R^{10}$ are the same; $R^2$, $R^3$, $R^4$ and $R^5$ are the same; and $R^6$ and $R^7$ are the same.

In the compound of formula II, preferred substituents for $R^2$, $R^3$, $R^4$, $R^5$, $R^6$, $R^7$, $R^8$, $R^9$ and $R^{10}$ are as defined immediately above.

The metal complexes of the present invention may be prepared by reacting the ligand with a compound of $MX_n \cdot A$ $(H_2O)$ X, wherein X may be selected from the group consisting of halogen, $C_{1-6}$ alkoxide, nitrate or sulfate, preferably halide and most preferably chloride or bromide; and A is 0 or an integer from 1–6.

The reaction of the ligand of formula I with the compound of the formula $MX_n \cdot A$ $(H_2O)$ may be conducted in a hydrocarbyl solvent at temperature from –50 to 250° C., preferably from 20 to 120° C.

The resulting compound may then be alkylated (either partially or fully). Some alkylating agents are Grignard agents of the formula RMgX and organolithium reagents LiR wherein R is a $C_{1-10}$ alkyl radical and X is a halogen and alkyl aluminum reagents. Alkyl aluminum reagents include trialkyl aluminum, alkyl aluminum halides (i.e. $(R)_xALX_{3-x}$ wherein R is a $C_{1-10}$ alkyl radical, X is a halogen, x is 1 or 2 and MAO as described below).

Solution polymerization processes are fairly well known in the art. These processes are conducted in the presence of an inert hydrocarbon solvent typically a $C_{5-12}$ hydrocarbon which may be unsubstituted or substituted by $C_{1-4}$ alkyl group such as pentane, hexane, heptane, octane, cyclohexane, methylcyclohexane or hydrogenated naphtha. An additional solvent is Isopar E ($C_{8-12}$ aliphatic solvent, Exxon Chemical Co.).

The polymerization may be conducted at temperatures from about 20 to about 250° C. Depending on the product being made, this temperature may be relatively low such as from 20 to about 180° C. The pressure of the reaction may be as high as about 15,000 psig for the older high pressure processes or may range from about 15 to 4,500 psig.

Suitable olefin monomers may be ethylene and $C_{3-20}$ mono- and di-olefins. Preferred monomers include ethylene and $C_{3-12}$ alpha olefins which are unsubstituted or substituted by up to two $C_{1-6}$ alkyl radicals. Illustrative nonlimiting examples of such alpha-olefins are one or more of propylene, 1-butene, 1-pentene, 1-hexene, 1-octene and 1-decene.

The reaction product of the present invention, in the presence of a single alpha olefin, may be an oligomer having a molecular weight (Mw) less than about 1500. The reaction product of the present invention may also be a co- or homopolymer of one or more alpha olefins. The polymers prepared in accordance with the present invention have a good molecular weight. That is, weight average molecular weight (Mw) will preferably be greater than about 50,000 ranging up to $10^7$, preferably $10^5$ to $10^7$.

The polyethylene polymers which may be prepared in accordance with the present invention typically comprise not less than 60, preferably not less than 70, most preferably not less than 80 weight % of ethylene and the balance of one or more $C_{4-10}$ alpha olefins, preferably selected from the group consisting of 1-butene, 1-hexene and 1-octene. The polyethylene prepared in accordance with the present invention may contain branching (e.g. one or more branches per 1000 carbon atoms, preferably 1–30 branches per 1000 carbon atoms, typical 1–20 branches per 1000 carbon atoms and most preferably 1–10 branches per 1000 carbon atoms).

The activator may be selected from the group consisting of:

(i) an aluminoxane; and (ii) an activator capable of ionizing the Group 8, 9 or 10 metal complex (which may be used in combination with an alkylating activator).

The aluminoxane activator may be of the formula $(R^{20})_2 AlO(R^{20}AlO)_m Al(R^{20})_2$ wherein each $R^{20}$ is independently selected from the group consisting of $C_{1-20}$ hydrocarbyl radicals, m is from 0 to 50, and preferably $R^{20}$ is a $C_{1-4}$ alkyl radical and m is from 5 to 30. The aluminoxane activator may be used prior to the reaction but preferably in situ alkylation is typical (e.g. alkyl groups replacing leaving ligands, hydrogen or halide groups).

If the Group 8, 9 or 10 metal complex is activated only with aluminoxane, the amount of aluminoxane will depend on the reactivity of the alkylating agent. Activation with aluminoxane generally requires a molar ratio of aluminum in the activator to the Group 8, 9 or 10 metal in the complex from 20:1 to 1000:1. MAO may be the higher end of the above noted range.

The activator of the present invention may be a combination of an art alkylating activator which also serves as a scavenger other than aluminoxane in combination with an activator capable of ionizing the Group 8, 9 or 10 complex.

The alkylating activator (which may also serve as a scavenger) may be selected from the group consisting of: $(R)_pMgX_{2-p}$ wherein X is a halide, each R is independently selected from the group consisting of $C_{1-10}$ alkyl radicals, preferably $C_{1-8}$ alkyl radicals and p is 1 or 2; RLi wherein R is as defined above; $(R)_qZnX_{2-q}$ wherein R is as defined above, X is halogen and q is 1 or 2; $(R)_sAlX_{3-s}$ wherein R is as defined above, X is halogen and s is an integer from 1 to 3. Preferably, in the above compounds R is a $C_{1-4}$ alkyl radical and X is chlorine. Commercially available compounds include triethyl aluminum (TEAL), diethyl aluminum chloride (DEAC), dibutyl magnesium ($(Bu)_2Mg$) and butyl ethyl magnesium (BuEtMg or BuMgEt).

The activator capable of ionizing the Group 8, 9 or 10 metal complex may be selected from the group consisting of:

(i) compounds of the formula $[R^{15}]^+[B(R^{18})_4]^-$ wherein B is a boron atom, $R^{15}$ is a cyclic $C_{5-7}$ aromatic cation or a triphenyl methyl cation and each $R^{18}$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom, and a silyl radical of the formula —Si—$(R^{19})_3$ wherein each $R^{19}$ is independently selected from the group consisting of a hydrogen atom and a $C_{1-4}$ alkyl radical; and (ii) compounds of the formula $[(R^{16})_tZH]^+[[B(R^{18})_4]^-$ wherein B is a boron atom, H is a hydrogen atom, Z is a nitrogen atom or phosphorus atom, t is 2 or 3 and $R^{16}$ is selected from the group consisting of $C_{1-8}$ alkyl radicals, a phenyl radical which is unsubstituted or substituted by up to three $C_{1-4}$ alkyl radicals, or one $R^{16}$ taken together with the nitrogen atom to form an anilinium radical and $R^{18}$ is as defined above; and (iii) compounds (activators) of the formula $B(R^{18})_3$ wherein $R^{18}$ is as defined above.

In the above compounds, preferably $R^{18}$ is a pentafluorophenyl radical, $R^{15}$ is a triphenylmethyl cation, Z is a nitrogen atom and $R^{16}$ is a $C_{1-4}$ alkyl radical or $R^{16}$ taken together with the nitrogen atom to form an anilinium radical which is substituted by two $C_{1-4}$ alkyl radicals.

The activator capable of ionizing the Group 8, 9 or 10 metal complex abstract one or more $L^1$ ligands so as to ionize the Group 8, 9 or 10 metal center into a cation, but not to covalently bond with the Group 8, 9 or 10 metal; and to provide sufficient distance between the ionized Group 8, 9 or 10 metal and the ionizing activator to permit a polymerizable olefin to enter the resulting active site.

Examples of compounds capable of ionizing the Group 8, 9 or 10 metal complex include the following compounds:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tributylammonium tetra(pentafluorophenyl)boron,
tri(n-butyl)ammonium tetra (o-tolyl)boron
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron
di-(isopropyl)ammonium tetra(pentafluorophenyl)boron,
dicyclohexylammonium tetra (phenyl)boron
triphenylphosphonium tetra)phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium) tetrakispentafluorophenyl borate,
tropillium phenyltris-pentafluorophenyl borate,
triphenylmethylium phenyl-trispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-trifluorophenyl) borate,
tropillium tetrakis (3,4,5-trifluorophenyl) borate,
benzene (diazonium) tetrakis (3,4,5-trifluorophenyl) borate,
tropillinum tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate,
triphenylmethylium tetrakis (2,3,4,5-tetrafluorophenyl) borate, and
benzene (diazonium) tetrakis (2,3,4,5-tetrafluorophehyl) borate.

Readily commercially available activators which are capable of ionizing the Group 8, 9 or 10 metal complexes include:

N,N-dimethylaniliumtetrakispentafluorophenyl borate;
triphenylmethylium tetrakispentafluorophenyl borate; and
trispentafluorophenyl boron.

If the Group 8, 9 or 10 metal complex is activated with a combination of an aluminum alkyl compound (generally other than aluminoxane), and a compound capable of ionizing the Group 8, 9 or 10 metal complex; the molar ratios of Group 8, 9 or 10 metal:metal in the alkylating agent (e.g. Al); metalloid (e.g. boron or phosphorus) in the activator capable of ionizing the Group 8, 9 or 10 metal complex (e.g. boron) may range from 1:1:1 to 1:100:5. Preferably, the alkylating activator is premixed/reacted with the Group 8, 9 or 10 metal complex and the resulting alkylated species is then reacted with the activator capable of ionizing the Group 8, 9 or 10 metal complex.

In a solution polymerization, the monomers are dissolved/dispersed in the solvent either prior to being fed to the reactor or for gaseous monomers, the monomer may be fed to the reactor so that it will dissolve in the reaction mixture. Prior to mixing, the solvent and monomers are generally purified to remove polar moieties. The polar moieties or catalyst poisons include water, oxygen, metal impurities, etc. Preferably steps are taken before provision of such into the reaction vessel, for example by chemical treatment or careful separation techniques after or during the synthesis or preparation of the various components. The feedstock purification prior to introduction into the reaction solvent follows standard practices in the art (e.g. molecular sieves, alumina beds and oxygen removal catalysts) are used for the purification of ethylene, alpha-olefin and optional diene. The solvent itself as well (e.g. cyclohexane and toluene) is similarly treated. In some instances, out of an abundance of caution, excess scavenging activators may be used in the polymerization process.

The feedstock may be heated prior to feeding into the reactor. However, in many instances it is desired to remove heat from the reactor so the feedstock may be at ambient temperature to help cool the reactor.

Generally, the catalyst components may be premixed in the solvent for the reaction or fed as separate streams to the reactor. In some instances premixing is desirable to provide a reaction time for the catalyst components prior to entering the reaction. Such an "in line mixing" technique is described in a number of patents in the name of DuPont Canada Inc. For example it is described in U.S. Pat. No. 5,589,555 issued Dec. 31, 1996.

The reactor may comprise a tube or serpentine reactor used in the "high pressure" polymerizations or it may comprise one or more reactors or autoclaves. It is well known that the use in series of two such reactors each of which may be operated so as to achieve different polymer molecular weight characteristics. The residence time in the reactor system will depend on the design and the capacity of the reactor. Generally, the reactors should be operated under conditions to achieve a thorough mixing of the reactants. On leaving the reactor system, the solvent is removed and the resulting polymer is finished in a conventional manner.

The present invention will now be illustrated by the following examples in which unless otherwise specified weight means weight % and parts means parts by weight (e.g. grams).

Materials: 2,6-dibromopyridine, diethylphosphine ($Et_2PH$), diphenylphosphine ($Ph_2PH$), di-tert-butylphosphine chloride (t-$Bu_2PCl$), iron (II) chloride ($FeCl_2$), iron (II) chloride tetrahydrates ($FeCl_2.4(H_2O)$), iron (II) tetrafluoroborate hexahydrate ($Fe(BF_4)_2.4H_2O$), iron (III) bromide ($FeBr_3$), iron (III) chloride ($FeCl_3.6H_2O$), cobalt chloride ($CoCl_2$), bis (benzonitrile) dichloropalladium (II) ($PdCl_2(PhCN)_2$), nickel (II) bromide ($NiBr_2$), n-Butyl lithium (BuLi, 1.6M in hexane), and trimethylsilyl azide ($TMSN_3$) were purchased from Aldrich Chemical Company, Inc. and Strem Chemical Inc. Solvents were prepared by passing through molecular sieves, de-oxo catalysts and alumina columns prior to use. Methylaluminoxane (PMAO-IP) (13.5 weight % of Al) was purchased from AKZO-NOBEL and used as supplied. 2,6-bis (diphenylphosphino)pyridine (Ic) was prepared using the method described in the literature (G. R. Newkome and D. C. Hager, J. Org. Chem., 43(5), 947,1978). Diimine-Nickel complex (VIII) was synthesized as described in the literature (L. K. Johnson, C. M. Killiam, M. Brookhart, J. Am. Chem. Soc., 117, 6414, 1995). The anhydrous toluene was purchased from Aldrich and purified over molecular sieves prior to use. $B(C_6F_5)_3$ was purchased from Boulder Scientific Inc. and used without further purification.

Measurements: NMR spectra were recorded using a Bruker 200 MHz spectrometer. $^1H$ NMR chemical shifts were reported with reference to tetramethylsilane. Polymer molecular weights and molecular weight distributions were measured by GPC (Waters 150-C.) at 140° C. in 1,2,4-trichlorobenzene calibrated using polyethylene standards. DSC was conducted on a DSC 220 C from Seiko Instruments. The heating rate is 10° C./minute from 0 to 200° C. FT-IR was conducted on a Nicolet Model 750 Magna IR spectrometer. MI was measured on an automatic MI machine with model number of MP993 at 190° C.

Operation: All synthesis and catalyst preparations were performed under nitrogen or argon using standard Schlenk techniques or in a dry-box.

EXAMPLES

Example 1

Synthesis of 2,6-(t-$Bu_2P)_2$pyridine (Ia)

To a THF (100 mL) solution of 2,6-dibromopyridine (2.37 g, 10 mmol) at −78° C. was added slowly a THF (30 mL) solution of BuLi (6.25 mL, 1.6M in hexane, 10 mmol). The resulting yellow solution was allowed to warm to −25° C. A THF (30 mL) solution of t-$Bu_2PCl$ (1.81 g, 10 mmol) was added to the reaction mixture slowly. The brown solution was allowed to warm to room temperature and was stirred for 1 hour. The reaction mixture was cooled to −78° C. and a THF (30 mL) solution of BuLi (6.25 mL, 1.6M in hexane, 10 mmol) was slowly added. The reaction mixture was warmed to −25° C. and a THF (30 mL) solution of t-$Bu_2PCl$ (1.81 g, 10 mmol) was added. The reaction mixture was warmed to room temperature and stirred for another 1 hour. All volatiles were then removed under vacuum. The resulting residue was dissolved in heptane (50 mL) and LiBr was removed by filtration. When the heptane was evaporated, a brown oily residue was obtained. The pure product was obtained by vacuum distillation of the residue (122° C./0.5 mmHg). $^1H$ NMR (toluene-$d_8$, δ): 1.29 (d, J=11.4 Hz, 36H), 6.95 (m, 1H), 7.45 (m, 2H). The purity and molecular formula ($M^+$=367 (30%)) were confirmed by GC-MS.

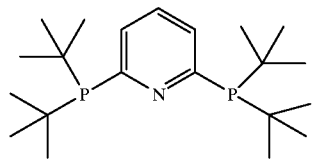

Example 2

Synthesis of 2,6-($Et_2P)_2$pyyridine (Ib)

A THF (100 mL) solution of diethyl phosphine (4.61 g, 51.2 mmol) was treated with n-BuLi (32 mL, 1.6 M, 51.2 mmol) using a drop-wise addition. The reaction mixture was allowed to stir 20 minutes and was then added to a solution of 2,6-dibromopyridine (6.04 g, 25.5 mmol) at 50° C. resulting in a darkening of the solution to a brown/black color. The reaction was then further heated at 50° C. for 5 hours. The product (1.52 g, yield: 50%) was purified by a short path distillation (76–78° C./0.3 mmHg).

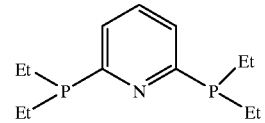

Example 3

Synthesis of 2,6-(t-$Bu_2P$=NTMS)$_2$pyridine (IIa)

A 200 mL Schlenk flask was fitted with a condenser, a nitrogen inlet, a gas outlet bubbler and a $TMSN_3$ (trimethyl silyl azide) addition line. The flask was charged with 2,6-(t-$Bu_2P)_2$pyridine (Ia) (1.84 g, 5 mmol). The $TMSN_3$ line was charged with $TMSN_3$ (7.3 mL, 5.5 mmol) through a syringe. At room temperature, 3 mL of $TMSN_3$ was injected into the flask and the mixture was heated to 95° C. The remaining $TMSN_3$ was added to the reaction at 95° C. As the addition occurred, nitrogen was evolved. After the addition was completed, the reaction mixture was kept for an additional 2 hours at 110° C. When the slight excess of $TMSN_3$ was removed under vacuum, a white solid (2.7 g, 100%) was obtained.

$^1H$ NMR (toluene-$d_8$, δ): 0.42 (s, 18H), 1.21 (d, J=14.3 Hz, 36H), 7.23 (m, 1H), 8.36 (m, 2H).

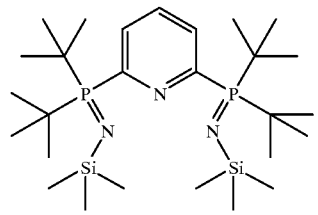

Example 4

Synthesis of 2,6-($Et_2P$=NTMS)$_2$pyridine (IIb)

A 200 mL Schlenk flask was fitted with a condenser, a nitrogen inlet, a gas outlet bubbler and a $TMSN_3$ addition line. The flask was charged with 2,6-($Et_2P)_2$pyridine (Ib) (1.28 g, 5 mmol). The $TMSN_3$ line was charged with $TMSN_3$ (7.3 mL, 5.5 mmol) through a syringe. At room temperature, 3 mL of $TMSN_3$ was injected into the flask and the mixture was heated to 95° C. The remaining $TMSN_3$ was added to the reaction at 95° C. As the addition occurred, nitrogen was evolved. After the addition was completed, the reaction mixture was kept for an additional 2 hours at 110° C. When the slight excess of $TMSN_3$ was removed under vacuum, an oil (2.15 g, 100%) was obtained. $^1H$ NMR (toluene-$d_8$, δ): 0.38 (s, 18H), 0.84 (t, J=7.6 Hz, 6H), 0.92 (t, J=7.7 Hz, 6H), 1.66(m, 8H), 7.19 (m, 2H), 8.06 (m, 2H).

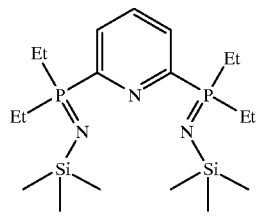

Example 5

Synthesis of 2,6-(Ph$_2$P=NTMS)$_2$pyridine (IIc)

A 200 mL Schlenk flask was fitted with a condenser, a nitrogen inlet, a gas outlet bubbler and a TMSN$_3$ addition line. The flask was charged with 2,6-(Ph$_2$P)$_2$pyridine (Ic) (2.24 g, 5 mmol). The TMSN$_3$ line was charged with TMSN$_3$ (7.3 mL, 5.5 mmol) through a syringe. At room temperature, 3 mL of TMSN$_3$ was injected into the flask and the mixture was heated to 95° C. The remaining TMSN$_3$ was added to the reaction at 95° C. As the addition occurred, nitrogen was evolved. After the addition was completed, the reaction mixture was kept for an additional 2 hours at 110° C. When the slight excess of TMSN$_3$ was removed under vacuum, a white solid (3.1 g, 100%) was obtained. $^1$H NMR (toluene-d$_8$, δ): 0.30 (s, 18H), 7.03 (m, 4H), 6.97 (m, 8H), 7.16 (m, 1 H), 7.55 (m, 8H), 8.32 (m, 2H).

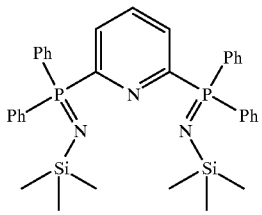

Examples 6–11

Synthesis of Catalyst Precursors

General Procedure: The ligand (2,6-(t-Bu$_2$P=NTMS)$_2$ pyridine (IIa), 1 eq.) and a metal salt (FeCl$_2$, FeCl$_2$.4H$_2$O, CoCl$_2$, FeBr$_3$, FeCl$_3$.6H$_2$O, or NiBr$_2$) were added together in a Schienk flask in a dry-box. Then the flask was charged with THF (30 mL) or dichloromethane (CH$_2$Cl$_2$, 30 mL). The mixture was stirred for several hours until there were no detectable metal salts left in the flask. The reaction solution was filtered to remove some insoluble polymeric materials and was concentrated. Heptane (5 mL) was added to precipitate the complex. The resultant solid was filtered and washed with heptane and dried in vacuo.

Example 6

Fe(II) Complex (IIIa) from FeCl$_2$

Isolated as a beige yellow solid (Yield: 80%). $^1$H NMR (THF-d8, all peaks appear as singlets due to their broadness, δ): 0.13 (s, br), 1.29 (s, br), 8.5 (s, br).

Example 7

Fe(II) Complex (IIIb) from FeCl$_2$.4H$_2$O

Isolated as a white solid (Yield: 90%). $^1$H NMR (THF-d8, all peaks appear as singlets due to their broadness, δ): 0.01 (s, br), 1.21 (s, br), 8.5 (s, br), 10.2 (s, br).

Example 8

Co(II) Complex (IV) from CoCl$_2$

Isolated as a blue solid (Yield: 100%). $^1$H NMR (THF-d8, all peaks appear as singlets due to their broadness, δ): –1.16 (s, br), 0.03 (s, br), 0.66 (s, br), 0.87 (s, br), 1.27 (s, br.), 7.13(s, br.), 7.46(s, br.).

Example 9

Fe(III) Complex (Va) from FeBr$_3$

Isolated as a brown solid (Yield: 95%). $^1$H NMR (THF-d8, δ): 0.09 (s, 18H), 1.24 (d, 36H), 8.4 (s, br, 2H), 7.97 (s, br., 1H).

Example 10

Fe(III) Complex (Vb) from FeCl$_3$.6H$_2$O

Isolated as a THF insoluble yellow solid (Yield: 100%).

Example 11

Ni(II) Complex (VI) from NiBr$_2$

Isolated as a greenish solid (Yield: 50%). $^1$H NMR (THF-d8, δ): 0.09 (s,18H), 1.23 (d, 36H), 8.3 (s, br, 2H), 7.95 (s, br., 1H).

Example 12

Pd(II) Complex (VII) from IIc and Pd(PhCN)$_2$Cl$_2$

The ligand (2,6-(Ph$_2$P=NTMS)$_2$pyridine, IIc) (0.622g, 1 mmol) and PdCl$_2$(PhCN)$_2$ (0.384 g, 1 mmol) were added together in a Schlenk flask in a dry-box. The flask was charged with dichloromethane (CH$_2$Cl$_2$, 30 mL). The mixture was stirred for 12 hours. The reaction solution was filtered to remove some insoluble polymeric materials and was concentrated. Heptane (5 mL) was added to precipitate the complex. The resultant solid was filtered, washed with heptane and dried in vacuo. The product was isolated as a yellow solid (Yield: 74%). $^1$H NMR (toluene-d$_8$, δ): 0.17 (s, 18H), 7.20 (m, 12H), 7.4 (m, 1H), 7.85 (m, 8H), 8.45 (m, 2H).

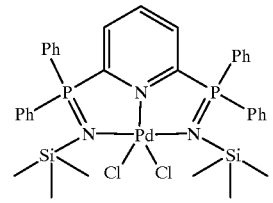

Polymerizations

Examples 13–15

Low Pressure Slurry Process

Ethylene polymerization experiments were carried out at room temperature in a Schlenk flask (50 mL) equipped with magnetic stirring bar with constant supply of neat gaseous ethylene at atmospheric pressure. The catalysts were activated by PMAO-IP. In a typical experiment, the flask was charged with a toluene (25 mL) solution of IIIa (15 mg, 0.0224 mmol) and was purged with ethylene gas. Then a toluene (5 mL) solution of PMAO-IP (13.5 Al weight %, 4.49 g, 22.4 mmol in toluene) was injected via syringe. After 0.5 hours, the ethylene supply was closed and the reaction mixture with polyethylene solid was pour into an acidified ethanol (5 vol % HCl). The product was filtered off and dried under vacuum for 6 hours.

TABLE 1

Polymerization of Ethylene at Low Pressure and Room Temperature

| Example No | Complex No. | Activity (gPE/mmol M. h) | Mol. Wt.* (polydispersity) |
|---|---|---|---|
| 13 | IIIa | 10.7 | 609,700 (1.8) |
| 14 | IIIb | 9.43 | 782,100 (2.4) |
| 15 | Va | 4.51 | 396,400 (1.7) |

*Oligomers were observed in the GPC measurements with molecular weight less than 1000. GC-MS analysis confirmed the presence of C18-C6 olefins.

Example 16–27
High Pressure Slurry and Solution Polymerizations

In the examples, the pressures given are gauge pressures. The following abbreviations and terms are used:

Branching: reported as the number of methyl groups per 1000 methylene groups in the polymer. It is determined by $^{13}C\{^1H\}$-NMR.

Polydispersity: weight average molecular weight (Mw) divided by number average molecular weight (Mn).

DSC: differential scanning calorimetry.

GPC: gel permeation chromatography.

MeOH: methanol.

PMAO-IP: a type of polymethylaluminoxane.

All the polymerization experiments described below were conducted using an Autoclave Engineers Zipperclave reactor (500 mL). All the chemicals (solvent, catalyst and cocatalyst) were fed into the reactor batchwise except ethylene which was fed on demand. No product was removed during the polymerization reaction. As are known to those skilled in the art, all the feed steams were purified prior to feeding into the reactor by contact with various absorption media to remove catalysts killing impurities such as water, oxygen, sulfur and polar materials. All components were stored and manipulated under an atmosphere of purified argon or nitrogen. The reactor uses a programmable logical control (PLC) system with Wonderware 5.1 software for the process control. Ethylene polymerizations were performed in the reactor equipped with an air driven stirrer and an automatic temperature control system.

The catalyst was dissolved in toluene. Polymerization temperature was 50° C. for slurry polymerizations and 140° C. for solution polymerizations. The polymerization reaction time varied from 9 to 60 minutes for each experiment. The reaction was terminated by adding 5 mL of methanol to the reactor and the polymer was recovered by evaporation of the solvent. The polymerization activities were calculated based on the weight of the polymer produced.

Slurry Polymerizations

Example 16
The Iron Complex (IIIa) with MAO Activation

Toluene (216 mL) was transferred into the reactor with 0.5 mL of PMAO-IP (216.0 umol) in 10 mL of toluene as a scavenger. The solution was heated to 50° C. and saturated with 300 psig of ethylene. The catalyst (IIIa) (64.6 umol, 43.2 mg) was dissolved in toluene (12.2 mL) and then injected into the reactor. After one minute, PMAO-IP (38.8 mmol, 8.6 mL) was injected into the reactor. The polymerization happened immediately and reaction temperature raised to 70° C. The reaction was terminated by adding 5 mL of MeOH after 30 minutes. The polymer was dried. Yield= 22.2 g. Activity=687.4 gPE/mmolcat*hr. Mn=943×10³. Tm=132.9° C. I2, I5 and I21 were not measurable indicating the formation of a high molecular weight polymer.

Example 17
The Iron Complex (IIIa) with Borane Activation

Toluene (216 mL) was transferred into the reactor with 0.5 mL of PMAO-IP (216.0 umol) in 10 mL of toluene as a scavenger. The solution was heated to 50° C. and saturated with 300 psig of ethylene. The catalyst (IIIa) (64.6 umol, 43.2 mg) was dissolved in toluene (11.8 mL) and transferred into a catalyst injection bomb, and then mixed with PMAO-IP (1.8 mmol, 0.4 mL). $B(C_6F_5)_3$ (68.4 umol, 35 mg) was dissolved in toluene (12.4 mL) and loaded into a cocatalyst injection bomb. The catalyst and cocatalyst were injected into the reactor simultaneously. The polymerization happened slowly at the beginning, then the polymerization temperature climbed to 97° C. The polymerization reaction was terminated by adding 5 mL of MeOH after 53 minutes. The polymer was dried. Yield=10.1 g. Activity=178.7 gPE/mmolcat*hr. Mn=687×10³. Tm=133.8° C. I2, I5 and I21 were not measurable indicating the formation of a high molecular weight polymer.

Example 18
The Iron Complex in-situ Formation then with MAO Activation

Toluene (216 mL) and $FeCl_2$ (64.6 umol, 8.2 mg) were transferred into the reactor with 0.5 mL of PMAO-IP (216.0 umol) in 10 mL of toluene as a scavenger. The solution was heated to 50° C. and saturated with 300 psig of ethylene. The ligand (IIa) (67 umol, 36.2 mg) was dissolved in toluene (12.2 mL) and then injected into the reactor. The reaction mixture was stirred for 5 minutes, then PMAO-IP (38.8 mmol, 8.6 mL) was injected into the reactor. No reaction temperature increase was observed. The reaction was terminated by adding 5 mL of MeOH after 36 minutes. The polymer was dried. Yield=3.3 g. Activity=85.3 gPE/mmolcat*hr. Tm=132.1° C. I2, I5 and I21 were not measurable indicating the formation of a high molecular weight polymer.

Example 19
The Iron Complex (IIIa) with MAO Activation for Ethylene and 1-Octene Copolymerization Toluene (216 mL) and 1-octene (30 mL) were transferred into the reactor with 0.5 mL of PMAO-IP (216.0 umol) in 10 mL of toluene as a scavenger. The solution was heated to 50° C. and saturated with 100 psig of ethylene. The catalyst (IIIa) (64.8 umol, 43.3 mg) was dissolved in toluene (12.2 mL) and then injected into the reactor. After one minute, PMAO-IP (38.8 mmol, 8.6 mL) was injected into the reactor. The reaction temperature reached 63° C. at the beginning. The polymerization reaction was terminated by adding 5 mL of MeOH after 9 minutes. The polymer was dried. Yield=5.4 g. Activity=555.8 gPE/mmolcat*hr. Mn=158.7×10³. Tm=105.9° C. 12.3 branches per 1000 carbon atoms was determined by $^{13}C\{^1H\}$ NMR. I2, I5 and I21 were not measurable indicating the formation of a high molecular weight polymer.

Example 20
The Cobalt Complex (IV) with MAO Activation

Toluene (216 mL) was transferred into the reactor with 0.5 mL of PMAO-IP (216.0 umol) in 10 mL of toluene as a scavenger. The solution was heated to 50° C. and saturated with 300 psig of ethylene. The catalyst (IV) (64.8 umol, 44.0 mg) was dissolved in toluene (12.2 mL) and then injected into the reactor. After one minute, PMAO-IP (38.8 mmol, 8.6 mL) was injected into the reactor. The polymerization happened immediately and reaction temperature raised to 63° C. The reaction was terminated by adding 5 mL of MeOH after 30 minutes. The polymer was dried. Yield=6.2 g. Activity=191.4 gPE/mmolcat*hr. Tm=127.3° C. I2, I5 and I21 were not measurable indicating the formation of a high molecular weight polymer.

Example 21
The Fe(III) Complex (Va) with MAO Activation

Toluene (216 mL) was transferred into the reactor with 0.5 mL of PMAO-IP (216.0 umol) in 10 mL of toluene as a scavenger. The solution was heated to 50° C. and saturated with 300 psig of ethylene. PMAO-IP (38.8 mmol, 8.6 mL) was injected into the reactor. After one minute, the catalyst (Va) (64.6 umol, 50.3 mg) was dissolved in toluene and injected to the reactor. The polymerization happened immediately and reaction temperature raised to 137° C. The reaction was terminated by adding 5 mL of MeOH after 9.5 minutes. The polymer was dried. Yield=20.4 g. Activity= 1956.0 gPE/mmolcat*hr. Tm=132.9° C. I2, I5 and I21 were not measurable indicating the formation of a high molecular weight polymer.

Example 22
The Nickel Complex (VI) with MAO Activation

Toluene (216 mL) was transferred into the reactor with 0.5 mL of PMAO-IP (216.0 umol) in 10 mL of toluene as a scavenger. The solution was heated to 50° C. and saturated with 300 psig of ethylene. PMAO-IP (38.8 mmol, 8.6 mL) was injected into the reactor. After one minute, the catalyst (VI) (64.6 umol, 43.8 mg) was dissolved in toluene and injected to the reactor. The polymerization happened immediately and reaction temperature raised to 75° C. The reaction was terminated by adding 5 mL of MeOH after 10 minutes. The polymer was dried. Yield=9.9 g. Activity= 913.9 gPE/mmolcat*hr. Tm=129.3° C. I2, I5 and I21 were not measurable indicating the formation of a high molecular weight polymer.

Example 23
The Palladium Complex (VII) with MAO Activation

Toluene (216 mL) was transferred into the reactor with 0.5 mL of PMAO-IP (216.0 umol) in 10 mL of toluene as a scavenger. The solution was heated to 50° C. and saturated with 300 psig of ethylene. PMAO-IP (38.8 mmol, 8.6 mL) was injected into the reactor. After one minute, the catalyst (VII) (69.3 umol, 51.9 mg) was dissolved in toluene (12.2 mL) and then injected into the reactor. Polymerization happened immediately and reaction temperature raised to 55° C. The reaction was terminated by adding 5 mL of MeOH after 20 minutes. The polymer was dried. Yield=6.3 g. Activity=272.8 gPE/mmolcat*hr. Tm=135.4° C. I21= 2.21; I2 and I5 were not measurable.

Solution Polymerizations

Example 24
The Iron Complex (IIIa) with MAO Activation

Toluene (216 mL) was transferred into the reactor with 0.5 mL of PMAO-IP (216.0 umol) in 10 mL of toluene as a scavenger. The solution was heated to 140° C. and saturated with 240 psig of ethylene. PMAO-IP (38.8 mmol, 8.6 mL) was injected into the reactor. After one minute, the catalyst (IIIa) (64.6 umol, 43.2 mg) was dissolved in toluene and injected to the reactor. The polymerization happened immediately, reaction temperature raised to 150° C. and the catalyst deactivated within minutes. The reaction was terminated by adding 5 mL of MeOH after 13 minutes. The polymer was dried. Yield=7.9 g. Activity=564.8 gPE/ mmolcat*hr. Tm=133.4° C. I2, I5 and I21 were not measurable indicating the formation of a high molecular weight polymer.

Example 25
The Fe(II) Complex (IIIb) with MAO Activation

Toluene (216 mL) was transferred into the reactor with 0.5 mL of PMAO-IP (216.0 umol) in 10 mL of toluene as a scavenger. The solution was heated to 140° C. and saturated with 286 psig of ethylene. PMAO-IP (38.8 mmol, 8.6 mL) was injected into the reactor. After one minute, the catalyst (IIIb) (64.6 umol, 44.5 mg) was dissolved in toluene and injected to the reactor. The polymerization happened immediately, reaction temperature raised to 150° C. and the catalyst deactivated within 1 minute. The reaction was terminated by adding 5 mL of MeOH after 10 minutes. The polymer was dried. Yield=6.1 g. Activity=564.3 gPE/ mmolcat*hr. Tm=141.0° C. I2, I5 and I21 were not measurable indicating the formation of a high molecular weight polymer.

Example 26
The Fe(III) Complex (Va) with MAO Activation for Ethylene and 1-Octene Copolymerization Toluene (216 mL) and 40 mL of 1-octene were transferred into the reactor with 0.5 mL of PMAO-IP (216.0 umol) in 10 mL of toluene as a scavenger. The solution was heated to 140° C. and saturated with 300 psig of ethylene. PMAO-IP (38.8 mmol, 8.6 mL) was injected into the reactor. After one minute, the catalyst (Va) (64.6 umol, 50.3 mg) was dissolved in toluene and injected to the reactor. The polymerization happened immediately with no temperature raise. The reaction was terminated by adding 5 mL of MeOH after 10 minutes. The polymer was dried. Yield=4.5 g. Activity= 409.7 gPE/mmolcat*hr. Tm=130.2° C. 8.2 branches per 1000 carbon atoms was determined by $^{13}C\{^1H\}$ NMR. I2 and I5 were not measurable and I21=0.3649.

Comparative Examples

Example 27
The Nickel Diimine Complex (VIII) with MAO Activation

Cyclohexane (216 mL) was transferred into the reactor. The solvent was heated to 160° C. and saturated with 306 psig of ethylene. PMAO-IP (13.0 mmol, 3.25 mL) was injected into the reactor. After one minute, the catalyst (VIII) (43.6 umol, 27.1 mg) was dissolved in toluene and injected to the reactor. The polymerization happened immediately with no temperature raise. The reaction was terminated by adding 5 mL of MeOH after 1 0 minutes. The polymer was dried. Yield=2.5 g. Activity=347.2 gPE/mmolcat*hr. Mn=2.2×10³. Mw=26×10³.

What is claimed is:
1. A ligand of formula I:

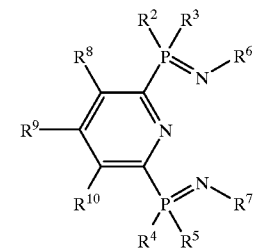

wherein $R^2$, $R^3$, $R^4$ and $R^5$ are independently selected from the group consisting of a hydrocarbyl radical which is unsubstituted, further substituted or an inert functional group; $R^6$ and $R^7$ are independently selected from the group consisting of a hydrocarbyl radical which is unsubstituted or further substituted, trialkyl silyl radical and an inert functional group; and $R^8$, $R^9$ and $R^{10}$ are independently selected from the group consisting of a hydrogen atom, a hydrocarbyl radical which is unsubstituted or further substituted and an inert functional group.

2. The ligand according to claim 1, wherein $R^8$, $R^9$ and $R^{10}$ are independently selected from the group consisting of a hydrogen atom and a $C_{1-4}$ alkyl radical.

3. The ligand according to claim 2, wherein $R^2$, $R^3$, $R^4$ and $R^5$ are independently selected from the group consisting of a $C_{1-10}$ alkyl or aryl radical.

4. The ligand according to claim 3, wherein $R^6$ and $R^7$ are independently selected from the group consisting of tri $C_{1-6}$ alkyl silyl radicals and phenyl radicals which are unsubstituted or substituted by up to five substituents independently selected from the group consisting of a $C_{1-10}$ hydrocarbyl radical or two hydrocarbyl radicals taken together may form a ring.

5. The ligand according to claim 4, wherein $R^2$, $R^3$, $R^4$ and $R^5$ are independently selected from the group consisting of a t-butyl radical or a phenyl radical.

6. The ligand according to claim 5, wherein $R^6$ and $R^7$ are independently selected from the group consisting of a trimethyl silyl radical and a 2,6-di-isopropyl phenyl radical.

7. The ligand according to claim 6, wherein $R^8$, $R^9$ and $R^{10}$ are a hydrogen atom.

8. The ligand according to claim 6, wherein $R^8$, $R^9$ and $R^{10}$ are independently selected from the group consisting of $C_{1-4}$ alkyl radicals.

9. The ligand according to claim 8, wherein $R^8$, $R^9$ and $R^{10}$ are the same.

10. A polyolefin having a weight average molecular weight (Mw) from $5\times10^4$ to $10^7$ and a degree of short chain branching from 1–30 per 1000 carbon atoms when prepared by a process for the polymerization of one or more $C_{2-12}$ alpha olefins in the presence of:

(a) a complex comprising a Group 8, 9 or 10 metal and ligand of formula I:

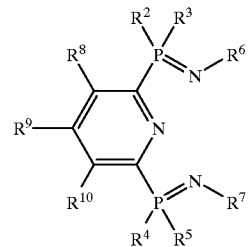

wherein $R^2$, $R^3$, $R^4$ and $R^5$ are each independently selected from the group consisting of hydrocarbyl, substituted hydrocarbyl or an inert functional group; $R^6$ and $R^7$ are each independently selected from hydrocarbyl, substituted hydrocarbyl, trialkyl silyl and substituted or unsubstituted aryl; and $R^8$, $R^9$ and $R^{10}$ are each independently selected from hydrogen, hydrocarbyl, substituted hydrocarbyl, an inert functional group; and (b) an activator at a temperature from 20 to 2500 C. and at a pressure from 15 to 15000 psi.

11. The polyolefin according to claim 10, having a weight average molecular weight (Mw) from $10^5$ to $10^7$.

12. The polyolefin according to claim 11, having a degree of short chain branching from 1–20 per 1000 carbon atoms.

13. The polyolefin according to claim 12, comprises at least 80 weight % of ethylene and up to 20 weight % of one or more monomers selected from the group consisting of propylene, 1-butene, 1-hexene and 1-octene.

14. A polyolefin having a weight average molecular weight (Mw) from $5\times10^4$ to $10^7$ and a degree of short chain branching from 1–30 per 1000 carbon atoms when prepared using an iron based catalyst.

15. A polyolefin having a molecular weight from $5\times10^4$ to $10^7$ and a degree of short chain branching from 1–20 per 1000 carbon atoms prepared in the presence of an iron or cobalt containing catalyst.

16. The polyolefin according to claim 15 comprising at least 80 weight % of ethylene and up to 20 weight % of one or more monomers selected from the group consisting of propylene, 1-butene, 1-hex&erie and 1-octene.

* * * * *